(12) United States Patent
Kobylski et al.

(10) Patent No.: US 7,237,817 B2
(45) Date of Patent: Jul. 3, 2007

(54) ROLL-OUT CARGO BED WITH CABLE TENSION RELEASE MECHANISM

(76) Inventors: Tony Kobylski, 29831 Avenita de Fiesta, Sun City, CA (US) 92586; Terry A. Kobylski, 29831 Avenita de Fiesta, Sun City, CA (US) 92586

( * ) Notice: Subject to any disclaimer, the term of this patent is extended or adjusted under 35 U.S.C. 154(b) by 92 days.

(21) Appl. No.: 11/043,345

(22) Filed: Jan. 26, 2005

(65) Prior Publication Data

US 2005/0212317 A1 Sep. 29, 2005

Related U.S. Application Data

(60) Provisional application No. 60/539,161, filed on Jan. 26, 2004.

(51) Int. Cl.
*B62D 39/00* (2006.01)
(52) U.S. Cl. .................. 296/26.09; 296/26.01
(58) Field of Classification Search ............. 296/26.01, 296/26.08, 26.09
See application file for complete search history.

(56) References Cited

U.S. PATENT DOCUMENTS

| | | | | |
|---|---|---|---|---|
| 5,184,931 A | * | 2/1993 | Safko | 296/26.09 |
| 5,564,767 A | * | 10/1996 | Strepek | 296/26.09 |
| 5,829,945 A | * | 11/1998 | Stanley | 296/26.09 |
| 5,934,725 A | | 8/1999 | Bowers | 296/26.09 |
| 6,065,792 A | | 5/2000 | Sciullo et al. | 296/26.09 |
| 6,312,034 B1 | | 11/2001 | Coleman, II et al. | 296/26.1 |
| 6,318,780 B1 | | 11/2001 | St. Aubin | 296/26.09 |
| 6,390,525 B2 | | 5/2002 | Carpenter et al. | 296/26.09 |
| 6,398,283 B1 | | 6/2002 | Knudtson et al. | 296/26.09 |
| 6,491,331 B1 | | 12/2002 | Fox | 296/26.09 |
| 6,503,036 B1 | * | 1/2003 | Bequette et al. | 296/26.09 |
| 6,659,524 B1 | | 12/2003 | Carlson | 296/26.09 |
| 6,705,656 B2 | | 3/2004 | Keller | 296/26.09 |
| 6,758,508 B2 | | 7/2004 | Weyhrich | 296/26.09 |

* cited by examiner

*Primary Examiner*—Lori L. Lyjak
(74) *Attorney, Agent, or Firm*—Kunzler & McKenzie

(57) ABSTRACT

A roll-out cargo bed comprises a frame structure configured to connect to a cargo bed of a vehicle, a plurality of bearings mounted to the frame structure, a deck connected to the frame structure, and a cable tension release mechanism disposed within the frame structure. The cable tension release mechanism may comprise a plurality of pulleys strategically spaced to facilitate extending the roll-out cargo bed. The roll-out cargo bed may further comprise a damper mechanism to reduce vibrations during transportation.

18 Claims, 8 Drawing Sheets

ROLL-OUT CARGO BED WITH CABLE TENSION RELEASE MECHANISM

CROSS-REFERENCES TO RELATED APPLICATIONS

This application claims priority to U.S. Provisional Patent Application No. 60/539,161 entitled "ROLL-OUT TRUCK BED" and filed on Jan. 26, 2004 for Tony Kobylski and Terry A. Kobylski, which is incorporated herein by reference.

BACKGROUND OF THE INVENTION

1. Field of the Invention

This invention relates to extendable cargo beds and more particularly relates to roll-out cargo beds with a cable tension release mechanism.

2. Description of the Related Art

Trucks and vehicles with a cargo area are generally used to transport equipment from one location to another. Typically, a cargo bed is built into the body of a vehicle to provide storage space for transporting various items. Problems arise, however, when a user must load and unload the equipment from the cargo area. The sides of the vehicle, which define the cargo area and enclose the equipment during transportation, become a barrier to the user while loading and unloading the equipment. Often, the user is not able to reach or pull out the items in the cargo bed, especially those items located near the cab of a vehicle. Consequently, the user must climb into the cargo bed, lift or move a particular item, and then jump out of the vehicle to finish unloading the item, which can be an extremely difficult and time-consuming process. Usually more than one person must collaborate to effectively load and unload a vehicle. The loading and unloading process can be costly and inconvenient and, in certain instance, can increase the health risk of the loader due to poor ergonomic conditions.

In recent years, extendible cargo beds that retract into the vehicle for transportation have enabled users to load/unload items outside of the vehicle cargo area. The extendible cargo beds available, however, are generally fraught with many faults. First of all, the moving platform for loading cargo is often difficult to control or manipulate. The weight from the cargo on the extended platform can cause the platform to slant and can stretch connecting cables, often destroying fragile cable tension release mechanisms. In certain cases the platform may derail, causing other calamities. In addition, the extendible cargo beds are often difficult to install and remove; thus, if the cable tension or the rail systems of an extendible cargo bed fail, the user may have a difficult time fixing the associated problems.

Another common problem that occurs in extendible cargo beds is vibration. During transportation, the motion from traveling and the load on the extendible cargo bed can cause the platform and corresponding frame members to sway and knock against each other. The resulting noise can be annoying to anyone in close proximity. In addition, the motion may negatively affect the components of the extendible cargo bed.

From the foregoing discussion, it should be apparent that a need exists for a reliable extendible cargo bed with an improved cable tension release system. Beneficially, such an apparatus and system would minimize the number of stresses that disrupt a cable tension release system. Additionally, the extendible cargo bed would be easy to control and would be easily installed/removed from the bed of a vehicle.

SUMMARY OF THE INVENTION

The present invention has been developed in response to the present state of the art, and in particular, in response to the problems and needs in the art that have not yet been fully solved by currently available extendible cargo beds. Accordingly, the present invention has been developed to provide a roll-out cargo bed with a tension release mechanism that overcomes many or all of the above-discussed shortcomings in the art.

A roll-out cargo bed, in one embodiment, comprises a frame structure configured to connect to a cargo bed of a vehicle, a plurality of bearings mounted to the frame structure, a deck connected to the frame structure, and a cable tension release mechanism disposed within the frame structure. The cable tension release mechanism facilitates safely extending the deck of the roll-out cargo bed. In one embodiment, the cable tension release mechanism comprises a plurality of pulleys strategically positioned to minimize the amount of force required to release locking pins, thereby enabling the user to easily extend the roll-out cargo bed.

In one embodiment, the cable tension release mechanism further comprises a plurality of brackets for mounting the pulleys to the frame structure, a plurality of cables, a plurality of spring loaded locking mechanisms, a polygonal-shaped rod, a pull lock knob configured to connect to the polygonal-shaped rod, and a pull rod sleeve to connect the polygonal-shaped rod to the cables. Handles, such as U-shaped handles, may be used to control the roll-out cargo bed and to function as a stop to prevent overextending associated cables. The polygonal-shaped rod, in one embodiment, may be inserted into a corresponding polygonal shaped hole in a cross member of the frame structure, consequently limiting the rotational movement of the polygonal-shaped rod. Thus, the polygonal-shaped rod prevents the cables from twisting and stretching.

In another embodiment, the roll-out cargo bed may further comprise a damper mechanism to reduce vibrations in the frame structure during transportation and other activity. The damper mechanism may comprise a bumper stop connected to the frame structure in one embodiment. Consequently, the deck or other components of the frame structure may be frictionally retained in a locked position against the bumper stop. The damper mechanism further protects the frame structure and reduces motion transferred to the cargo items.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides a tension release mechanism that increases the stability and utility of the roll-out cargo bed. In addition, a damper mechanism reduces problems associated with vibration. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
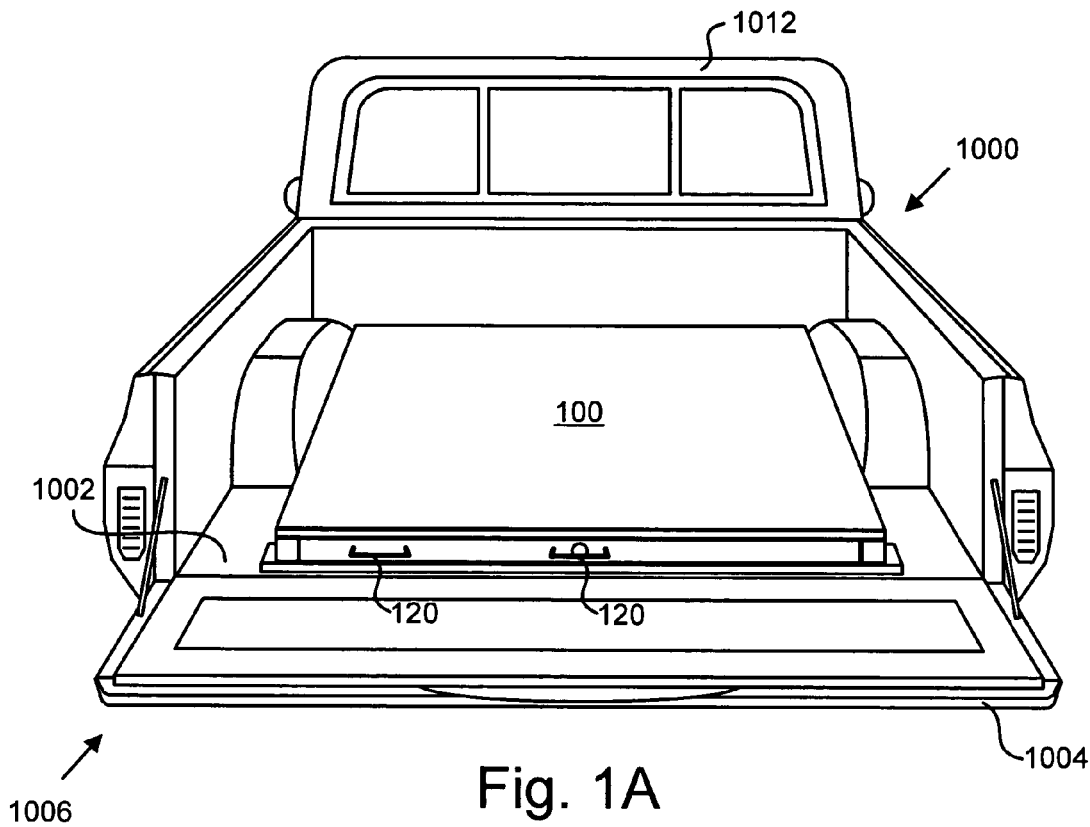
FIG. 1A is perspective view illustrating one embodiment of a roll-out cargo bed in a storage position in accordance with the present invention.

FIG. 1A illustrates one embodiment of a roll-out cargo bed 1000 connected to a truck bed 1002. The roll-out cargo bed 1000 preferably fits within the truck bed 1002 such that a tailgate 1004 or other type of enclosure may be opened and closed without obstruction. The roll-out cargo bed 1000 comprises a deck 100, a plurality of handles 120, a frame assembly, and a pulley assembly (not shown).

The deck 100 rests on top of the frame assembly in certain embodiments. The combined structure can typically support about the same amount of weight that a truck bed 1002 can support, which is about 1200 lbs. The deck 100 may be sized to correspond to the dimensions of a particular truck or vehicle. Thus, the deck 100 can efficiently store or transport nearly the same amount of equipment as the original truck bed 1002, or the cargo bed of a chosen vehicle. Typical sizes may range between about 60 to about 94 inches. In certain embodiments, the roll-out cargo bed 1000 may be angled to fit the angled beds 1002 or angled tailgates 1004 of certain trucks currently available in the market. Consequently, the deck 100 does not catch on the tailgate 1004. Additionally, the deck 100 may be carpeted or the like to provide a pleasant work surface. In one embodiment, the deck 100 is spray-coated with urethane to prevent weathering. The deck 100 may also provide protection to the original truck bed 1002.

The roll-out cargo bed 1000 of FIG. 1A is in a storage position 1006, which comprises the deck 100 being located within the confines of the truck bed 1002 and being locked by pins to the frame assembly. The storage position 1006 may also comprise a transport position for transporting cargo on the roll-out cargo bed 1000.

Figure 1B:
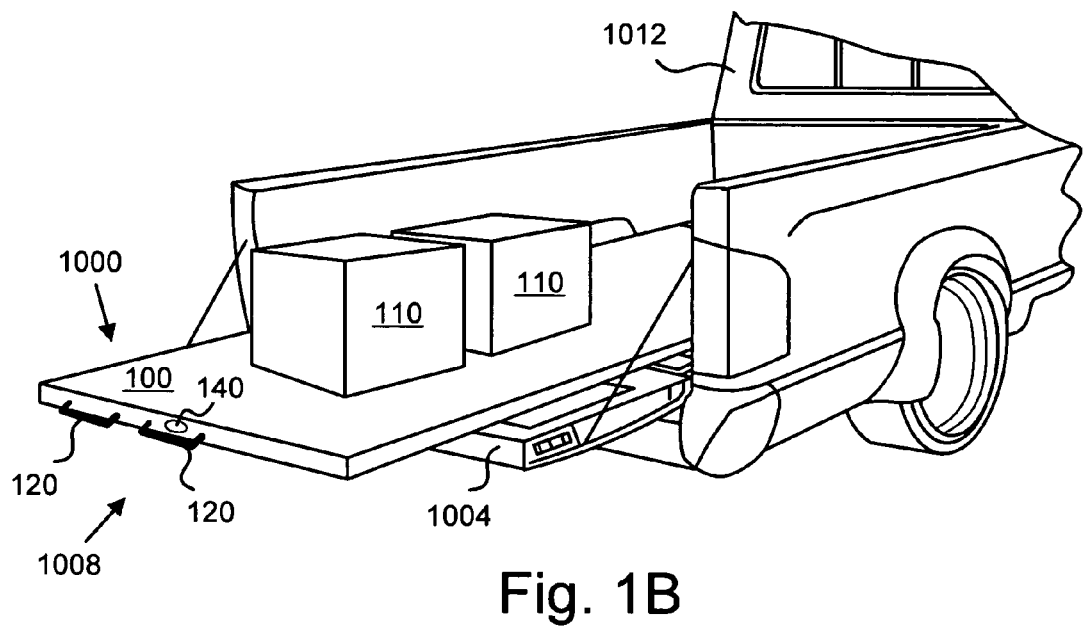
FIG. 1B is a perspective view illustrating one embodiment of a roll-out cargo bed in an extended position in accordance with the present invention.

FIG. 1B illustrates one embodiment of a roll-out cargo bed 1000 in an extended position 1008. In an extended position 1008, a user may access equipment 110 from the sides of the deck 100.

To facilitate extending the roll-out cargo bed 1000, a plurality of handles 120 may be attached to the frame assembly and/or deck 100. The handles 120 enable one user to control the movement of the roll-out cargo bed 1000 using one or two hands. Of course, more than one user may assist pulling the deck 100 from the storage position 1006 to an extended position 1008 if desired. A U-shaped handle 120 may also have a dual function as a stop to help maintain the tension of the cables, which will be described below in greater detail. In addition, a pull lock knob 140 allows a user to release spring-loaded locking pins. Consequently, a user can control how far the deck 100 extends with the pull lock knob 140.

To accommodate the user, the roll-out cargo bed 1000 may have a plurality of locking positions to secure the deck 100 in a stable position. For example, the roll-out cargo bed 1000 may be locked in a storage position 1006 as discussed above, or the roll-out cargo bed 1000 may be locked in a variety of extended positions 1008. In one embodiment, the roll-out cargo bed 1000 has a minimum of three locking positions. In FIG. 1B, the roll-out cargo bed 1000 is locked midway between the tailgate 1004 and the cab 1012 of the truck. In a fully extended position, the deck 100 may lock with about 18 inches of the deck 100 remaining just inside of the tailgate 1004 in one embodiment. Consequently, a user may access nearly the entire deck 100 from outside of the vehicle. For discussion purposes, references to "front" refer to the general direction toward the cab 1012 of the truck and references to "back" refer to the direction toward the tailgate 1004 of the truck.

Figure 2:
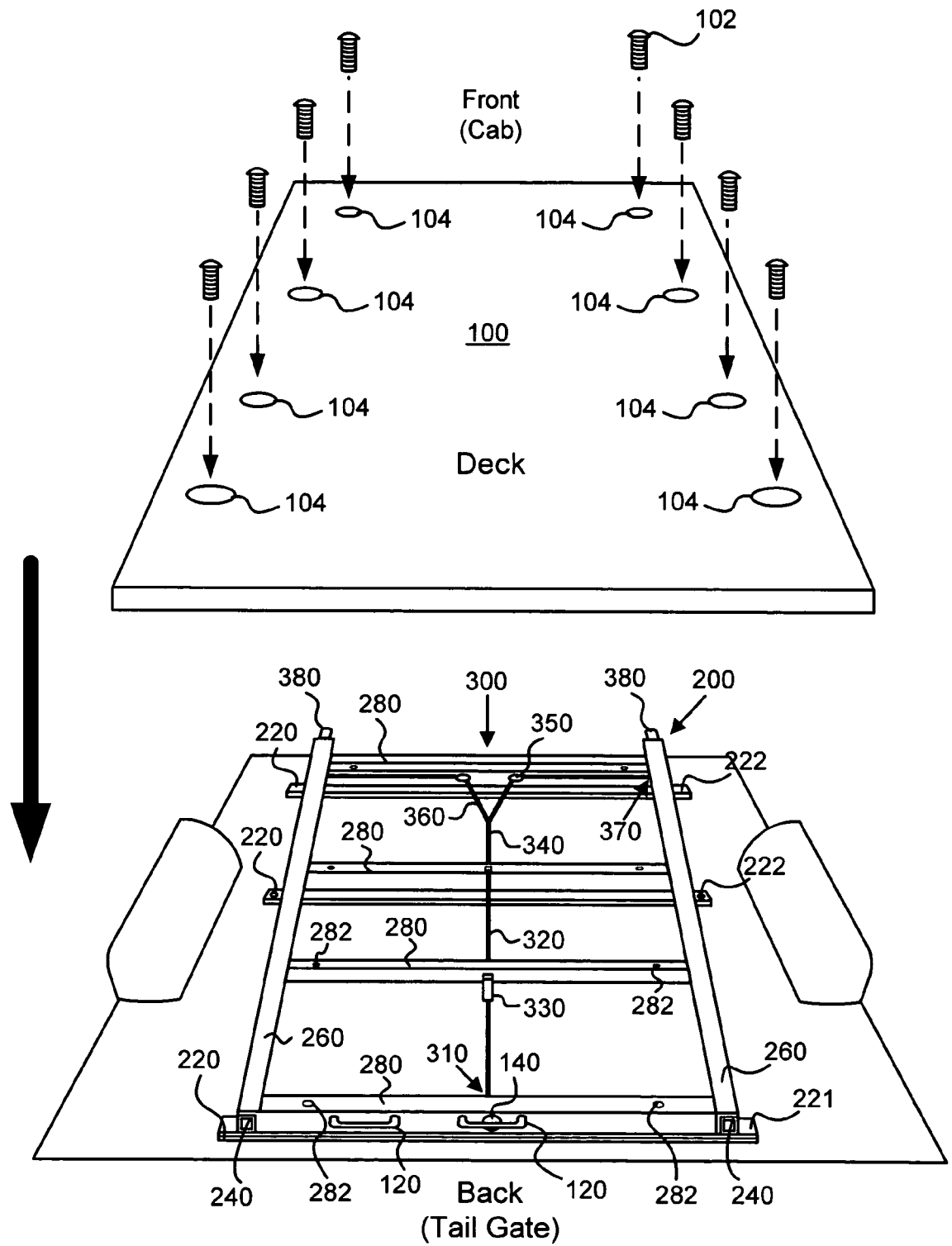
FIG. 2 is an exploded view of one embodiment of a roll-out cargo bed of the present invention.

FIG. 2 further illustrates the functional components of one embodiment of a roll-out cargo bed 1000 of the present invention. The components include a deck 100, a frame assembly 200, and a pulley assembly 300. The frame assembly 200 comprises straps 220, bottom rails 240, top rails 260, and cross members 280. The pulley assembly 300 comprises handles 120, a pull lock knob 140, an adjustment mechanism 310, a square rod 320, a bracket stop 330, a cable sleeve 340, a plurality of pulleys 350, cables 360, spring-loaded locking mechanisms 370, and bumper stops 380.

The deck 100, as illustrated, may be secured to a frame assembly 200 with a plurality of fasteners such as bolts or screws 102. In one embodiment, the deck 100 is made of plywood, though any rigid, durable material may be appropriate. Additionally, the deck 100 may consist of one flat piece, or the deck 100 may consist of several smaller sections.

In one embodiment, the deck 100 includes holes 104 to connect the deck 100 to the frame assembly 200. In one embodiment, screws 102 are screwed into tapped holes 282 in the cross members 280 of the frame assembly 200. The number of holes 104 may vary with the number of cross members 280. For example, a 94-inch embodiment of a roll-out cargo bed 1000 may include four cross members 280. Accordingly, the deck 100 may have eight holes 104, two holes 104 corresponding to each cross member 280. Alternatively, a 60-inch embodiment of a roll-out cargo bed 1000 may only include three cross members 280. Thus, the deck 100 may comprise only six holes 104, two holes 104 corresponding to each cross member 280.

The frame assembly 200 may be secured to a truck bed 1002 by way of a plurality of straps 220. The straps 220 may contain holes 222 to secure the roll-out cargo bed 1000 to the truck bed 1002 with fasteners such as bolts. In one embodiment, the straps 220 are made from steel to provide support to the roll-out cargo bed 1000. The bottom rails 240 may be welded to the straps 220 in certain embodiments. The bottom rails 240 may be made from a hollow, rectangular tube. The top rails 260 may be L-shaped and may fit on top of the bottom rails 240. The rails 240, 260 and cross members 280, in certain embodiments, are made from steel. The cross members 280 accordingly may be welded to the top rails 260.

The pulley assembly 300 of the present invention allows a user to control the roll-out cargo bed 1000 as the deck 100 transitions from a locked storage position 1006 to various extended positions 1008. The present invention provides an improved cable tension release mechanism that is safer to use and more effective than the cable tension release mechanisms known in the art. The present invention permits a user to control the tension and movement of the cables 360. As a result, the locking pins stay in place and the deck 100 transitions more smoothly and accurately. The cable tension release mechanism will be discussed below in greater detail.

Figure 3A:
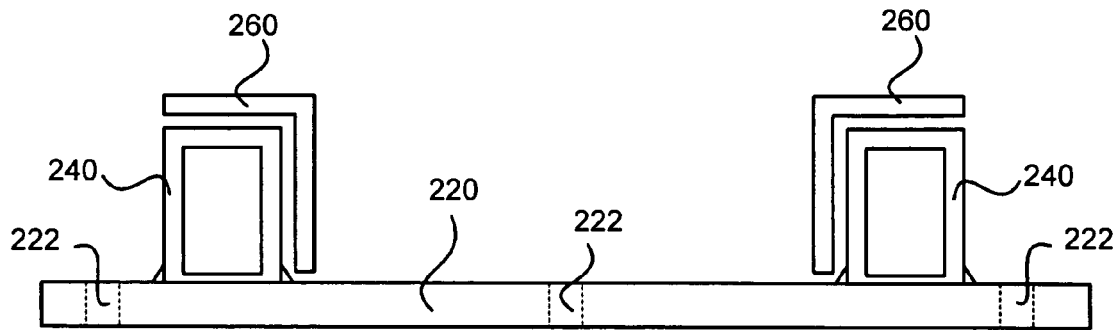
FIG. 3A is an end view illustrating one embodiment of a plurality of bottom rails attached to a mounting strap.
Figure 3B:
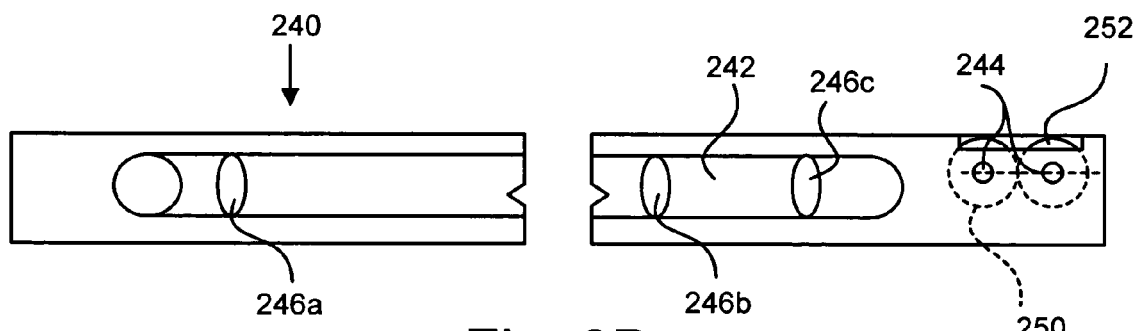
FIG. 3B is a side view illustrating one embodiment of a bottom rail in accordance with the present invention.

Referring now to FIGS. 3A-3B, FIG. 3A illustrates one embodiment of a mounting strap 220 attached to a plurality of bottom rails 240. The mounting straps 220, in one embodiment, are solid, rectangular metal bars. Preferably, a roll-out cargo bed 1000 comprises three mounting straps 220: a back mounting strap 220, a middle mounting strap 220, and a front mounting strap 220. The strap 220 as represented in FIG. 3 is from an end view as if the viewer is looking from the back of the truck bed 1002 toward the front.

In one embodiment, the bottom rails 240 are securely welded to the straps 220. As mentioned, the mounting straps 220 may vary in size depending on the size of a particular vehicle. The mounting bar(s) 220 may rest against the floor of the truck bed 1002, and in certain embodiments, are fastened to the truck bed 1002 with bolts. Accordingly, the front and middle straps 220 may have holes 222 to receive bolts. In one embodiment, the back strap 220 does not include holes 222, because the weight of the deck 100 in an extended position 1008 presses the back strap 220 down against the bed of the truck 1002, thereby reducing the need for additional fasteners. However, holes 222 may be included in the back strap 220 as well in certain embodiments.

The back strap 220 may further include one or more flat bars 221 welded between the bottom rails 240 and the mounting strap 220 (FIG. 2). The flat bar may serve as an intermediate layer or spacer to stabilize the roll-out cargo bed 1000. Also, if a truck has a raised tailgate 1004 or a tailgate 1004 that angles upward, the flat bar lifts the roll-out cargo bed 1000 above the tailgate 1004. Consequently, the deck 100 rolls out and slightly angles up, thereby avoiding contact with any part of the truck. Also, the weight of the items on the deck 100 does not cause the deck 100 to tip downward because of the slight upward angle. In one embodiment, the flat bar has dimensions of about 3½ by 2¼ by 2 inches.

FIG. 3B illustrates in greater detail the characteristics of one embodiment of a bottom rail 240. The roll-out cargo bed 1000 may comprises a plurality of bottom rails 240. In one embodiment, the roll-out cargo bed 1000 comprises a right rail 240 and a left rail 240. Slots 242, holes 244, and holes 246 represent those as viewed by looking at the interior side of the rails 240.

The bottom rails 240 may be hollowed-out tubes that permit bearings connected to the top rail 260 to roll inside the bottom rails 240. Slots 242 allow the bearings connected to the top rail 260 to traverse the length of the bottom rail 240. The slots 242 may cover about ⅔ the length of the rails 240 to enable extension of the deck 100 (FIG. 1). The holes 244 permit bolts to secure bearings 250 in the bottom rail 240. The oblong holes 246 are configured to receive pins configured to extend through the top rail 260 and the bottom rail 240, thereby locking the rails 240, 260 together.

When the pins are locked in the holes 246a, the roll-out cargo bed 1000 is in a storage position 1006. When the pins are locked in the holes 246b and 246c, the roll-out cargo bed 1000 is in a midway extended position and a fully extended position 1008 respectively. The pins, in one embodiment, are connected to cables 360 that are controlled by the pulley assembly 300. The pins may extend through designated holes in the top rails 260 and through the holes 246 in the bottom rails 240.

Figure 3C:
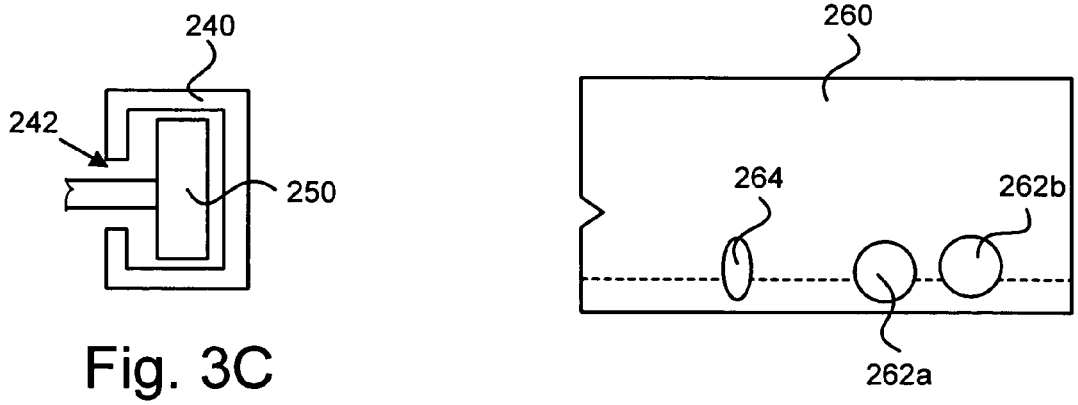
FIG. 3C is a cross-sectional view of one embodiment of a bottom rail in accordance with the present invention.

FIG. 3C illustrates a cross-sectional view of a bottom rail 240 with a slot 242. The bearing 250 preferably fits inside the hollowed section. In one embodiment, the roll-out cargo bed 1000 comprises eight bearings 250: two bearings 250 connected to each top rail 260 and two bearings 250 connected to each bottom rail 240. In a storage position 1006, the four bearings 250 in the top rails 260 are located near the front of the truck while the four bearings 250 in the bottom rails 240 remain in a fixed position near the back of the truck. The bearings 250 in the top rails 260 roll on the inside of the hollow tube of the bottom rail 240 when transitioning from a storage position 1006 to an extended position 1008.

The bearings 250 in the bottom rails 240 may be fastened or bolted to the bottom rails 240. Each rail 240 may comprise two bearings 250. In one embodiment, the top side of the bottom rail 240 includes a slot 252 to permit the bearings 250 to roll on the interior side of the top rail 260. Accordingly, the center of the bearings 250 may be located slightly above the center of the bottom rail 240 as illustrated such that the bearings 250 may extend above the top surface of the bottom rail 240. The bearings 250 may be secured with bolts and nuts. In one embodiment, the nuts may be welded to the inside of the bottom rails 240. In one embodiment, the bearings 250 may have a diameter of about 1.653 inches and a width of about 0.508 inches and may be made of steel. In one embodiment, standoffs may be used with the bolts.

The top rails 260 may be substantially L-shaped and may be situated on top of the bottom rails 240. Accordingly, the length of the top rail 260 may correspond to the length of the bottom rail 240. As mentioned, the top rails 260 may ride on top of bearings 250. The bearings 250 connected to the top rail 260 are preferably located near the front end of the rail 260 near the cab 1012, thereby enabling the bearings 250 to roll within the hollow bottom rail 240. Because the bearings 250 are securely attached to the top rail 260, the deck 100 may roll to an extended position without rolling off of the bottom rails 240.

Figure 3D:
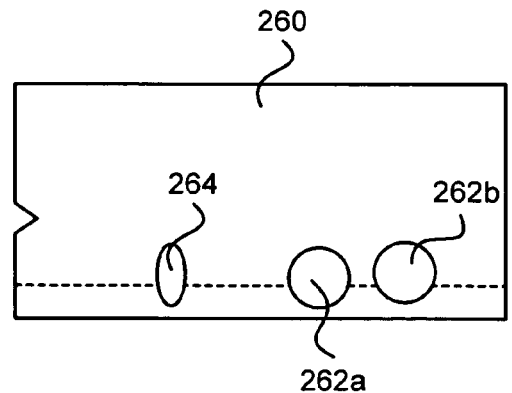
FIG. 3D is a partial side view of a top rail in accordance with the present invention.

FIG. 3D illustrates one embodiment of a top rail 260 with holes 262, 264. In one embodiment, a bearing hole 262$b$ closest to the cab 1012 on each top rail 240 is preferably offset slightly from the bearing hole 262$a$ to allow the bearings 250 to maintain constant contact with the bottom rails 240 during transition. The offset bearing 250 prevents the deck 100 from tipping downward in the extended position 1008. In one embodiment, the offset bearing 250 is $\frac{1}{16}$ of an inch higher than the rest of the bearings 250. A hole 264 is configured to receive a locking pin. The locking pin may remain in the same hole 264 in the top rail 240 and move with the top rail 260.

Figure 4:
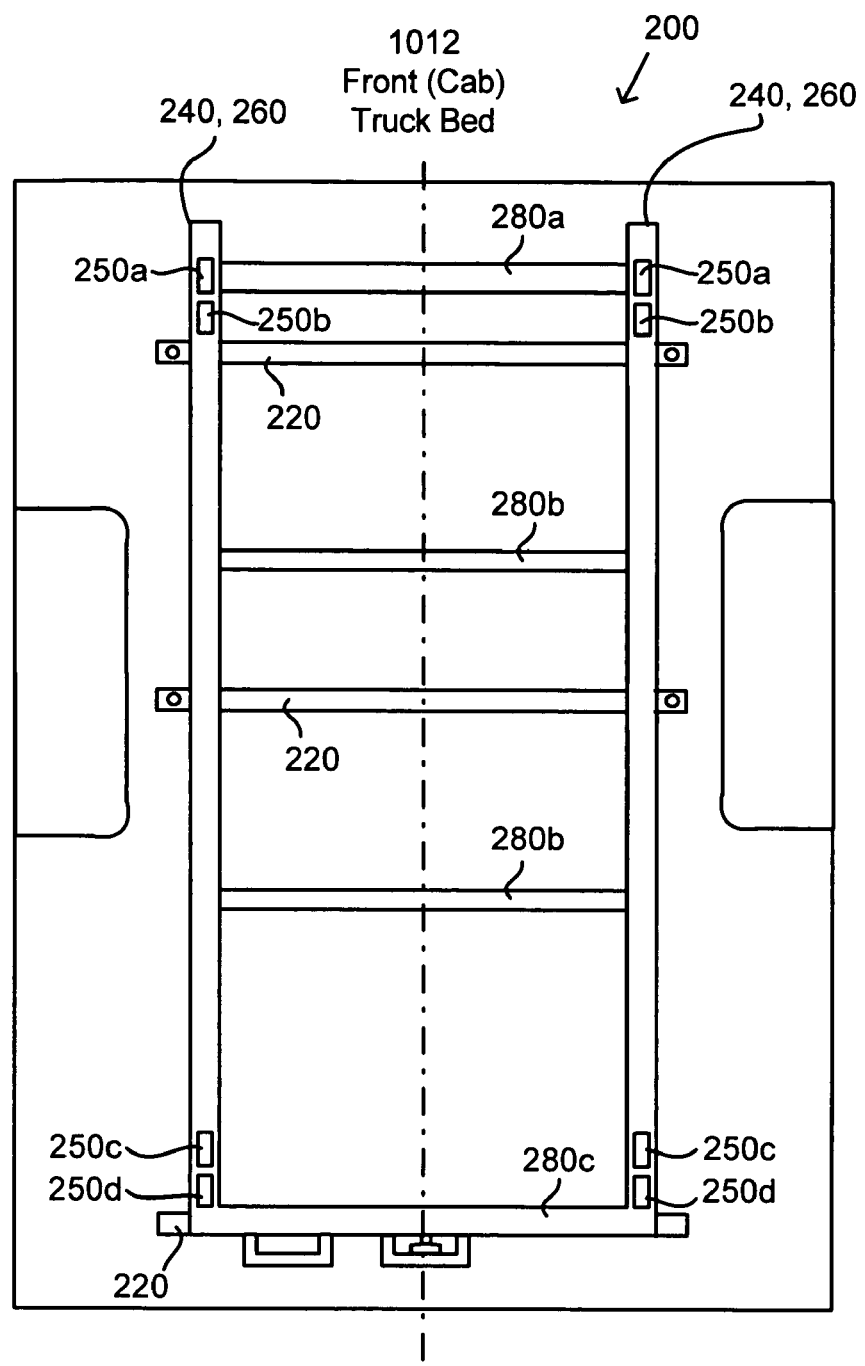
FIG. 4 is a top view illustrating one embodiment of a frame structure of the present invention.

FIG. 4 illustrates one embodiment of the frame assembly 200 including mounting straps 220, cross members 280, and rails 240, 260. More specifically, FIG. 4 illustrates the location of the bearings 250 in one embodiment when the roll-out cargo bed 1000 is in a storage position 1006. Two bearings 250$a$-$b$ are located in the top rail 260 near the cab 1012 of the truck. Two bearings 250$c$-$d$ are located in a fixed position in the bottom rails 240 near the tailgate 1004 of the truck.

The weight of the equipment 110 on the deck 100 pushes downward on the rails 240, 260 in the storage position 1006. Subsequently, the bearings 250$a$-$b$ ride on the bottom interior surface of the hollow bottom rails 240 during the majority of the transition from the storage position 1006 to the extended position 1008. Nearing the fully extended position 1008, however, the weight of the equipment 110 on the extended deck 100 causes pressure upward on the front of the top rails 260. Consequently, the bearings 250$a$-$b$ of the top rail 260 roll on the top interior surface of the bottom rail 240.

As a result, the bearings 250$a$ near the truck cab 1012 are preferably offset to compensate for the weight and drop of the deck 100 in the extended position 1008. Thus, the deck 100 rolls out of the truck at an angle substantially parallel to the ground without dropping significantly. The offset bearing 250$a$ is preferably set about $\frac{1}{16}$ inches above the bearing 250$b$. Accordingly, the offset bearing 250$a$ contacts the top interior surface of the hollowed portion of the bottom rail 240 while the bearing 250$b$ continues to contact the bottom interior surface, thereby preserving the horizontal position of the extended deck 100.

Figure 5:
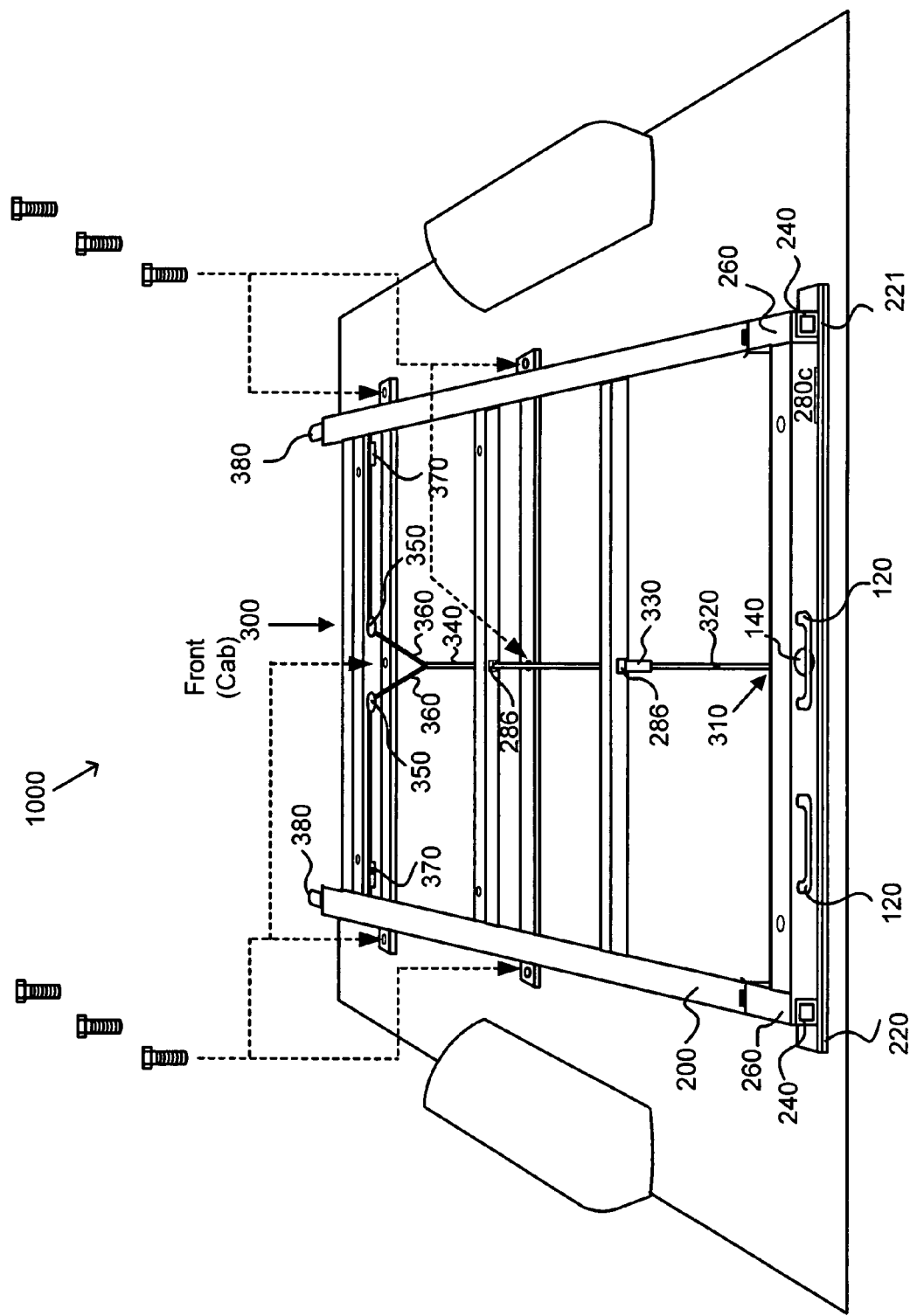
FIG. 5 is a perspective view of one embodiment of a roll-out cargo bed of the present invention without a deck.

FIG. 5 illustrates in greater detail the frame assembly 200 of one embodiment of a roll-out cargo bed 1000 combined with the pulley assembly 300. The pulley assembly 300 offers an improved tension release mechanism. As mentioned previously, the tension release mechanism may include the handles 120, a pull lock knob 140, an adjustment mechanism 310, a square rod 320, a bracket stop 330, a cable sleeve 340, a plurality of pulleys 350, cables 360, spring-loaded locking mechanisms 370, and bumper stops 380.

In one embodiment, a user releases the pins from the holes 246 in the bottom rail 240 by pulling on the pull lock knob 140. The pull lock knob 140 is stopped by the U-shaped handle 120, so the user cannot overextend the cables 360 with normal use. The pull lock knob 140 is connected to an adjustment mechanism 310 that allows the user to adjust the tension on the cables 360 if necessary. The adjustment mechanism 310 may be located near the interior side of the cross member 280$c$.

The adjustment mechanism 310 is preferably connected to a rod. In one embodiment, the rod is a square rod 320. The square rod 320 may be made from a hard metal such as steel or iron that does not stretch or bend easily. Accordingly, the metal rod 320 is an improvement in the art because the rod 320 replaces a large length of cable 360, which is prone to stretch. Also, the rod 320 may be passed through one or more holes 286. In one embodiment, a hole 286 has the same cross-sectional shape as the rod 320. Because the metal rod 320 does not stretch or twist, the tension on the shorter length of cables 360 is more easily maintained. Furthermore, the rod 320 has a polygonal shape to catch against a similarly-shaped pull rod guide 500 as mentioned previously. Thus, the position of the rod 320 is preserved. The rod 320 does not twist or rotate. Consequently, the fixed position creates a more stable system that resists the stretching or twisting that can potentially destroy the pulley assembly 300.

The metal pull rod 320 may be connected to a cable sleeve 340. The cable sleeve 340 connects the pull rod 320 to the cables 360. The cables 360 wrap around the pulleys 350 and connect to a spring-loaded locking mechanism 370. The spring-loaded locking mechanism 370 controls the locking pins that insert into the holes 246, 264 and lock the roll-out cargo bed 1000 into position.

Figure 6A:
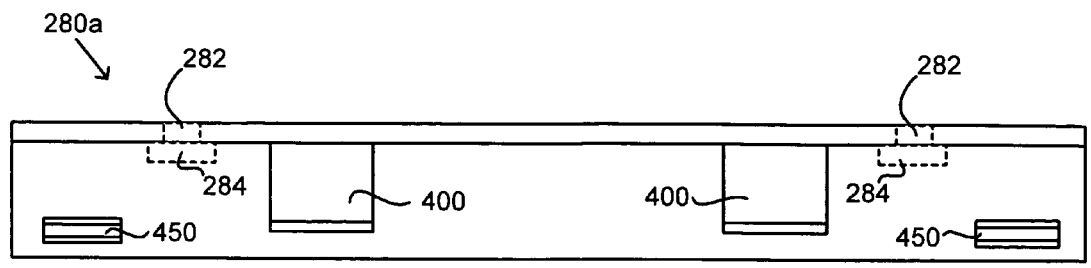
FIGS. 6A-6C are side views of various embodiments of a plurality of cross members in accordance with the present invention.
Figure 6B:
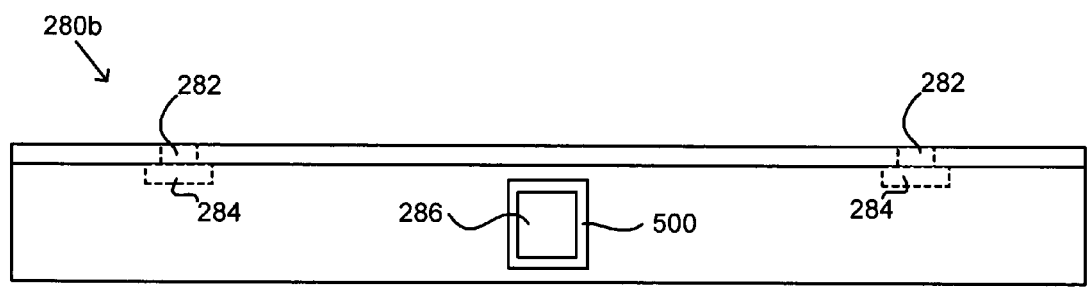
Figure 6C:
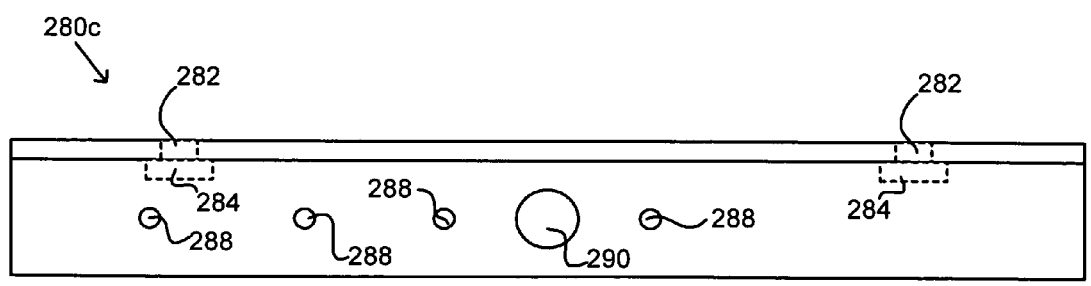

FIGS. 6A–6C illustrate in greater detail various embodiments of cross members 280. As mentioned previously, the number of cross members 280 may vary depending on the length of the roll-out cargo bed 1000. The cross members 280 may comprise a front cross member 280$a$, middle cross member(s) 280$b$, and a back cross member 280$c$. The cross members 280 are preferably made from angle iron. Holes 282 permit a fastener such as a bolt to connect the front cross member 280$a$ to the deck 100. Side view 283 illustrates nuts 284 welded to the cross member 280$a$. In an alternative embodiment, the holes 282 are tapped in order to eliminate the nuts 284.

FIG. 6A further illustrates the front cross member 280$a$ with a plurality of pulley brackets 400 welded to it. The pulley brackets 400 are L-shaped and include a hole 402 to secure a pulley 350 to the pulley bracket 400 with a fastener such as a nut and bolt assembly. In addition, holes 403 may permit tension pins to keep cables 360 in place.

Also illustrated are locking pin guides 450. The locking pin guides 450 are welded to the cross member 280$a$ to guide locking pins into the holes 264 in the top rails 260 and into the holes 246 in the bottom rails 240. The locking pin guides 450 may be rectangular in shape and may comprise a hollowed-out center for a locking pin to run through the locking pin guide 450. Additionally, the locking pin guide 450 may include a spacer (not shown) to help position the locking pin guide 450 properly.

FIG. 6B illustrates one embodiment of a center cross member 280b. The center cross member 280b comprises a hole 286 configured to receive a pull rod guide 500. The pull rod guide 500 receives a square rod 320 that is configured to keep the pulley cables 360 from twisting. The guide 500 may be made from a section of square hollow tubing as illustrated. Alternatively, the pull rod guide 500 may be any polygonal shape that corresponds to the shape of the rod 320. Preferably, the pull rod guide 500 is welded to the cross member 280b. The guide 500 may be inserted through the hole 286 and welded into the hole 286.

FIG. 6C illustrates one embodiment of a back cross member 280c. The back cross member 280c includes holes 288 to connect a plurality of U-shaped handles 120 to the back cross member 280c. The cross member 280c also has a hole 290 to permit the pull lock knob 140 to be accessed by the user. The pull lock knob 140 connects to the pulley assembly 300 to allow the user to release the pins that lock the deck 100 in position. The U-shaped handle 120 may function as a stop for the pull lock knob 140. Consequently, the pull lock knob 140 may be located between the U-shaped handle 120 and the back cross member 280c. The pull lock knob 140 may be inserted into the hole 290, and then the U-shaped handle 120 may be connected over top of the pull lock knob 140. A user may pull on the handles 120 to pull the deck 100 from a storage position 1006 to an extended position 1008.

Figure 7:
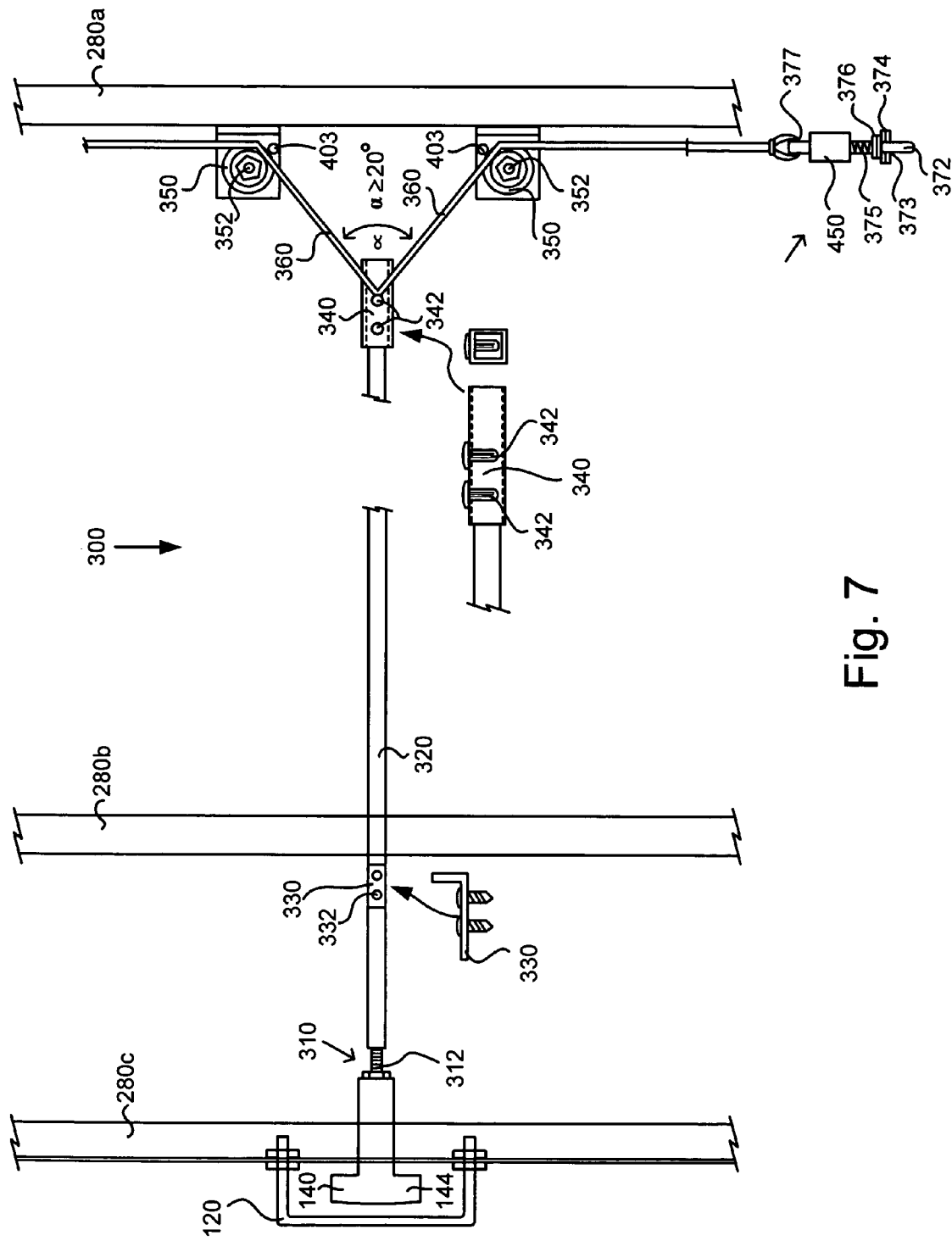
FIG. 7 is a top view of one embodiment of a pulley assembly of a cable tension release mechanism in accordance with the present invention.

FIG. 7 further illustrates some of the components of the pulley assembly 300 of the present invention. The U-shaped handle 120 functions as a stop for the pull lock knob 140. The adjustment mechanism 310 allows the user to adjust the tension on the cables 360 by loosening or tightening the jam nut 312.

The pulley assembly 300 also includes a bracket stop 330. The bracket stop 330 is connected to the pull rod 320 and prevents the cables 360 from retracting too far. The bracket 330 may be L-shaped and stops against the cross member 280b. Accordingly, the pulley assembly comprises a plurality of stops. The U-shaped handle 120 prevents the cables from extending too far, and the bracket stop 330 prevents the cables from retracting too far. Thus, the tension on the cables is maintained at a constant, functional level.

The cable sleeve 340 is a hollow square tube that includes holes 342 to secure the sleeve 340 to the square rod 320 and to the cables 360. The cables 360 are preferably made from stainless steel aircraft gauge braided cable, though any metal cord may be suitable.

FIG. 7 also illustrates an adjusted pulley angle. The pulleys 350 are placed such that the angle α is greater than about twenty degrees. In one embodiment, the angle α is about forty-five degrees. A wider angle may enable the user to pull out the locking pins with less effort. As a result, the pulley assembly 300 is easier to manipulate and control: the user applies less force to release the pins. Because the user applies less force, the assembly 300 is less likely to be disrupted or yanked out of place, a hazard that could potentially destroy the tension system.

Also, the improved pulley system 300 allows the locking mechanisms 370 to function more easily, consistently maintaining locking pins in the proper position. The controlled tension and regulated movement of the cables 360 prevents the pins from being knocked out of the locking pin guides 450.

The pull lock knob 140 allows the user to grasp the knob 140 with a few fingers while his/her hand remains around the U-shaped handle 120. Thus, the user can control the deck 100 with the U-shaped handle 120 and can control the release of the pins with the pull lock knob 140. The knob 140 includes a threaded hole that enables the adjustment mechanism 310 to be connected to the pull lock knob 140. The pull lock knob 140 may be made of aluminum. The knob 140 may also include a finger grip 144. The finger grip 144 preferably has a diameter greater than the diameter of the hole 290 in the back cross member 280c, so the knob 140 may not retract into the hole 290. The hole 290 also functions as a stop in the pulley assembly 300.

The adjustment mechanism 310 may comprise an all-thread member 314 that may be inserted into a threaded hole. A nut 312 may control the amount of adjustment that may be made to the cable tension.

Screws or other forms of fastener may connect the pull rod stop bracket 330 to the square pull rod 320 near the center cross member 280b. To allow the bracket 330 to be secured with screws, the bracket 330 may include holes 332. Additionally, the bracket 330 may be L-shaped and may be made from flat bar stock. The pull rod stop bracket 330 maintains the tension of the cables 360 by preventing the cables 360 from becoming too loose. Once the user releases the pull lock knob 140, the stop bracket 330 catches on the center cross member 280b. Thus, the cable tension remains controlled.

The cable sleeve 340 connects the cables 360 to the square pull rod 320. The sleeve 340 may be made from hollow metal tubing. In addition, the sleeve 340 may include holes 342 on top to connect the sleeve 340 to the square pull rod 320 with screws. The holes 342 do not extend through the bottom of the sleeve 340. Holes 344, however, may extend from one side of the sleeve 340 to the other side. Holes 344 allow the braided cable 360 to run through the holes 344.

The pulley bracket 400 is preferably attached to the front cross member 280a as illustrated in FIG. 6A. The brackets 400 are placed a calculated distance apart from each other so the angle created between the cables 360 is greater than 20 degrees. In a preferred embodiment, the angle is about 45 degrees. The increased angle allows the user to release the locking pins with greater ease as mentioned previously. The tension release mechanism places less stress on the cables 360 and other components of the pulley assembly 300. Consequently, the pulley assembly 300 is more durable. A nut and bolt assembly 352 may secure the pulley 350 to the pulley bracket 400. Tension pins 404 inserted into holes 403 keep the cable 360 from slipping off of the pulley 350.

A spring-loaded locking mechanism 370 may be connected to a cable 360. When the user pulls on the pull lock knob 140, the added tension on the cables 360 pulls the pins 372 out of the holes 246 in the bottom rails 240. Accordingly, when the pins 372 are pulled out, the deck 100 is free to roll out to an extended position 1008. The locking pins 372 may lock the roll-out cargo bed in a plurality of locked positions.

The locking pins 372 may comprise a hole 373 that extends through the locking pin 372 to receive tension pins 374. The tension pins 374 hold the spring 375 in a wound position against the locking pin guide 450, or locking pin sleeve. Alternatively, locking pins 372 may comprise a C-clip to replace the tension pin 374.

The locking pin guide 450, as mentioned previously, may be welded to the cross member 280a and may include a spacer. A washer 376 may separate the spring 375 from the tension pins 374. The spring 375 has stored pressure pushing against the tensions pins 374. When the locking pin 372 is released from a locking position, the pressure of the spring 375 restores the pin 372 back into a pin hole 246 in the bottom rail 240. Additionally, the locking pins 372 may have holes 377 to allow the pins 372 to be connected to the cable 360. Furthermore, the locking pins 372 are preferably made of stainless steel.

Figure 8A:
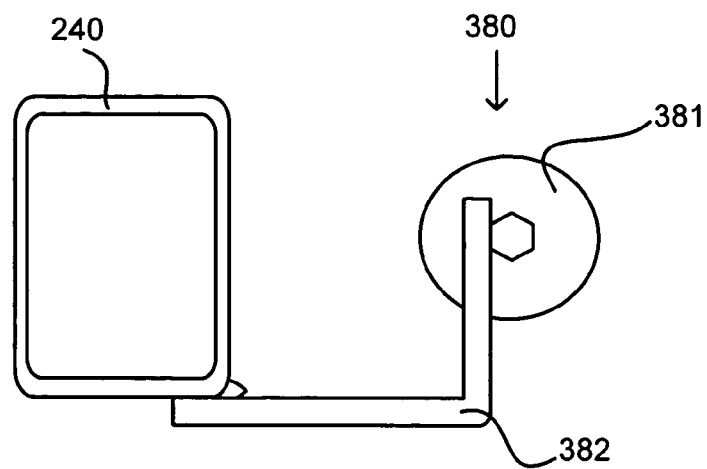
FIGS. 8A-8B are an end view and side view of one embodiment of a bumper stop of a damper mechanism in accordance with the present invention.
Figure 8B:
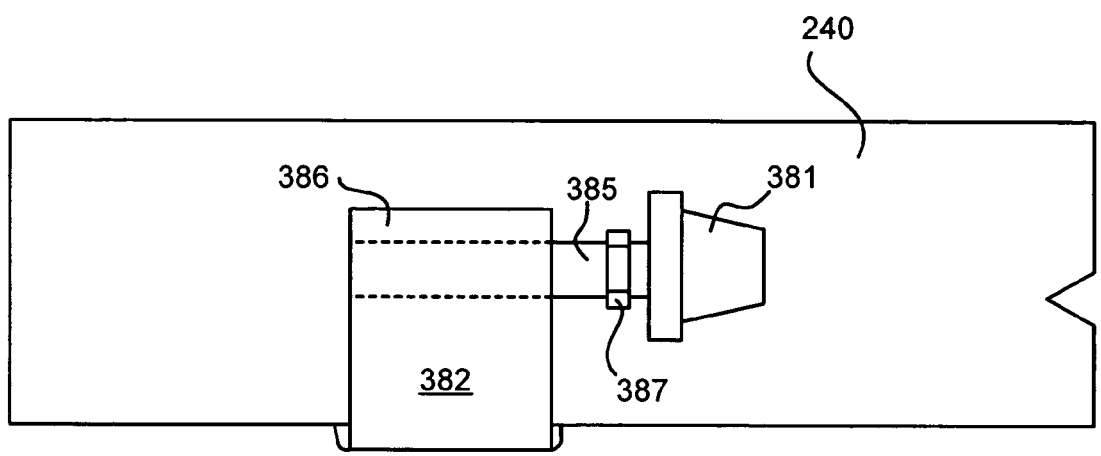

FIGS. 8A-8B illustrate one embodiment of a bumper stop 380 of the damper mechanism. The bumper stop 380 prevents movement of the deck 100 during travel. The weight of the equipment 110 on the deck 100 and the movement of the truck cause the deck 100 to rock back and forth, causing the components of the frame assembly 200 to hit against each other. The bumper stops 380 lessen the sound and vibration caused from the impacts. The bumper stops 380 are preferably made of vulcanized rubber or a similar resilient material. In one embodiment, a vibration dampener 381, such as those used as feet on washers or refrigerators, comprises the bumper stop 380 of the present invention.

The bumper stops 380 function when the deck 100 is locked in the storage position 1006. Preferably, the bumper stops 380 are connected to a mount 382 that is welded to the bottom rail 240. The mounts 382 may be L-shaped and may be made of angle iron. A mount 382 may be connected to the front end of a bottom rail 240 such that the back of the bumper stop 380 faces the cab 1012 of the truck. The mount 380 is preferably welded between the front end of the bottom rail 240 and the front pin hole 246a in the bottom rail 240. Thus, when the deck 100 is in a locked storage position 1006, the top rail 260 is tight against the bumper stop 380. The bumper stop 380 prevents movement of the deck 100 and frame assembly 200.

FIG. 9B illustrates one manner of mounting the bumper stop 380 to the mount 382. A screw or a bolt 385 may extend through a threaded standoff 386 to connect to the vibration dampener 381. A jam nut 387 may be included to secure the vibration dampener 381.

Thus, a user pushes the deck 100 tightly against the bumper stops 380 to lock the deck 100 in the storage position 1006. Because the stops 380 are made of rubber, the stop 380 gives just enough for the locking pins 272 to lock into place in the holes 246a. Once the pins 272 are in place, the rubber bumper stops 380 maintain pressure against the deck 100, thereby putting pressure on the pins 272. The pins 272 are consequently locked tightly into position. The stops 380 accordingly minimize the movement and noise caused by the deck 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A roll-out cargo bed comprising:
   a frame structure configured to connect to a cargo bed of a vehicle, the frame structure comprising at least one top rail and at least one bottom rail;
   a plurality of bearings mounted to the frame structure, the plurality of bearings configured to enable a top rail to roll relative to a bottom rail;
   a deck connected to the frame structure, the deck configured to roll with the bearings to an extended position; and
   a cable tension release mechanism disposed within the frame structure, the cable tension release mechanism comprising a plurality of pulleys;
   at least one cross member disposed between the at least one top rail and a second top rail, the cross member configured to connect to the deck; and
   wherein the at least one cross member comprises a polygonal-shaped hole.

2. The roll-out cargo bed of claim 1, wherein the frame structure further comprises at least one mounting strap for mounting the frame structure to the cargo bed of the vehicle.

3. The roll-out cargo bed of claim 2, wherein the mounting straps are configured to incline the bottom rail relative to the cargo bed of the vehicle.

4. The roll-out cargo bed of claim 1, wherein the plurality of bearings are offset by about $\frac{1}{16}$ inch.

5. The roll-out cargo bed of claim 1, wherein the cable-tension release mechanism comprises:
   a plurality of brackets connected to the frame structure, the brackets configured to retain the plurality of pulleys;
   a plurality of cables to wrap around the pulleys;
   a plurality of spring loaded locking mechanisms connected to a first end of the cables;
   a polygonal-shaped rod connected to a second end of the cables;
   a pull lock knob configured to connect to the polygonal-shaped rod such that pulling on the knob applies pressure to the cables; and
   a pull rod sleeve connected at a first end to the polygonal-shaped rod and at a second end to the cables.

6. The roll-out cargo bed of claim 5, further comprising a plurality of handles connected to the frame structure, wherein at least one handle is positioned to limit the extension range of the pull lock knob.

7. The roll-out cargo bed of claim 5, wherein the polygonal-shaped rod is inserted into a corresponding polygonal-shaped hole in the cross member.

8. The roll-out cargo bed of claim 5, further comprising a bracket connected to the polygonal-shaped rod and configured to limit movement of the polygonal-shaped rod.

9. The roll-out cargo bed of claim 5, wherein the pulleys are positioned at an angle $\alpha > 20$ degrees.

10. The roll-out cargo bed of claim 5, wherein the pulleys are positioned at an angle $\alpha \sim 45$ degrees.

11. A roll-out cargo bed comprising:
    a frame structure configured to connect to a cargo bed of a vehicle, the frame structure comprising at least one top rail and at least one bottom rail;
    a plurality of bearings mounted to the frame structure, the plurality of bearings configured to enable a top rail to roll relative to a bottom rail;
    a deck connected to the frame structure, the deck configured to roll with the bearings to an extended position; and
    a cable tension release mechanism disposed within the frame structure; and
    a damper mechanism disposed within the frame structure, the damper mechanism configured to reduce vibrations within the frame structure.

12. The roll-out cargo bed of claim 11, further comprising a cable tension release mechanism disposed within the frame structure, the cable tension release mechanism comprising a plurality of pulleys.

13. The roll-out cargo bed of claim 12, wherein the frame structure further comprises at least one cross member disposed between opposing top rails, the cross member comprising a polygonal-shaped hole.

14. The roll-out cargo bed of claim 13, wherein the cable tension release mechanism further comprise a polygonal-shaped rod, wherein the polygonal-shaped rod is inserted into a corresponding polygonal-shaped hole in a cross member.

15. The roll-out cargo bed of claim 14, wherein the pulleys are positioned at an angle α~45 degrees.

16. The roll-out cargo bed of claim 15, further comprising a plurality of handles connected to the frame structure, wherein at least one handle is positioned to limit the extension range of the pull lock knob.

17. The roll-out cargo bed of claim 16, wherein the damper mechanism comprises a bumper stop connected to the frame structure.

18. A roll-out cargo bed comprising:
   a frame structure configured to connect to a cargo bed of a vehicle, the frame structure comprising at least one top rail and at least one bottom rail;
   a plurality of bearings mounted to the frame structure, the plurality of bearings configured to enable a top rail to roll relative to a bottom rail;
   a deck connected to the frame structure, the deck configured to roll with the bearings to an extended position;
   a cable tension release mechanism disposed within the frame structure; and
   a damper mechanism disposed within the frame structure, the damper mechanism configured to reduce vibrations within the frame structure;
   a cable tension release mechanism disposed within the frame structure, the cable tension release mechanism comprising a plurality of pulleys, wherein the pulleys are positioned at an angle α~45 degrees;
   at least one cross member disposed between opposing top rails, the cross member comprising a polygonal-shaped hole; and
   a polygonal-shaped rod, wherein the polygonal-shaped rod is inserted into a corresponding polygonal-shaped hole in a cross member.

* * * * *